(12) United States Patent
Lee et al.

(10) Patent No.: US 8,869,382 B1
(45) Date of Patent: Oct. 28, 2014

(54) METHOD OF MANUFACTURING A DISK DRIVE SUSPENSION

(75) Inventors: Yu-Min Lee, Saratoga, CA (US); Tzong-Shii Pan, San Jose, CA (US)

(73) Assignee: Westren Digital Technologies, Inc., Irvine, CA (US)

( * ) Notice: Subject to any disclaimer, the term of this patent is extended or adjusted under 35 U.S.C. 154(b) by 240 days.

(21) Appl. No.: 13/418,595

(22) Filed: Mar. 13, 2012

Related U.S. Application Data

(62) Division of application No. 12/199,757, filed on Aug. 27, 2008, now Pat. No. 8,159,785.

(51) Int. Cl.
*G11B 5/127* (2006.01)
*H04R 31/00* (2006.01)

(52) U.S. Cl.
USPC ............ 29/603.03; 29/603.07; 29/602.1; 360/240; 360/244.2; 360/244.5; 360/244.8; 360/245.2

(58) Field of Classification Search
CPC ............ G11B 3/12; G11B 3/124; G11B 3/38; G11B 3/40; G11B 5/127; G11B 5/295; G11B 5/4813; G11B 5/4826; G11B 5/4833; G11B 5/484; G11B 5/84
USPC ............ 29/603.03–603.07; 360/345.2, 240, 360/244.2, 244.5–244.8, 245.2, 266.1
See application file for complete search history.

(56) References Cited

U.S. PATENT DOCUMENTS

| | | | |
|---|---|---|---|
| 4,760,478 A | 7/1988 | Pal et al. | |
| 5,187,625 A | 2/1993 | Blaeser et al. | |
| 5,461,525 A | 10/1995 | Christianson et al. | |
| 5,606,477 A | 2/1997 | Erpelding et al. | |
| 5,623,758 A | 4/1997 | Brooks, Jr. et al. | |
| 5,796,553 A | 8/1998 | Tangren | |
| 5,796,554 A | 8/1998 | Berding et al. | |
| 5,875,072 A | 2/1999 | Brooks, Jr. et al. | |
| 5,894,381 A | 4/1999 | Allen et al. | |
| 5,894,655 A | 4/1999 | Symons | |
| 6,005,750 A | 12/1999 | Willard et al. | |
| 6,028,742 A | 2/2000 | Kazama | |
| 6,307,715 B1 | 10/2001 | Berding et al. | |
| 6,498,704 B1 | 12/2002 | Chessman et al. | |
| 6,532,135 B1 | 3/2003 | Chen et al. | |
| 6,594,114 B1 | 7/2003 | Suzuki et al. | |
| 6,687,091 B1 | 2/2004 | Chen et al. | |

(Continued)

OTHER PUBLICATIONS

Office Action dated Aug. 8, 2011 from U.S. Appl. No. 12/199,757, 11 pages.

(Continued)

*Primary Examiner* — Paul D Kim

(57) ABSTRACT

A method of manufacturing a suspension for a disk drive includes providing and assembling an actuator coupling plate, a bend region, a load beam, and a head receiving gimbal. The load beam has a first end and a second end and defines a longitudinal axis that bisects the first end and the second end. The load beam is coupled to the gimbal proximate the first end and includes a base region proximate the second end, the base region having a first lateral section to one side of the longitudinal axis and a second lateral section to another side of the longitudinal axis. The first and the second lateral sections define a gap therebetween, and the base region has a bridge extending across the gap. A constraint layer overlays the gap and the bridge.

15 Claims, 9 Drawing Sheets

(56) References Cited

U.S. PATENT DOCUMENTS

| | | |
|---|---|---|
| 6,700,747 B2 | 3/2004 | Matz |
| 6,731,466 B2 | 5/2004 | Arya |
| 6,778,362 B1 | 8/2004 | Davis et al. |
| 6,790,133 B2 * | 9/2004 | Nuno .................. 451/318 |
| 7,038,885 B2 | 5/2006 | Erpelding |
| 7,050,267 B2 | 5/2006 | Koh et al. |
| 7,054,109 B2 | 5/2006 | Erpelding |
| 7,064,931 B2 | 6/2006 | Hutchinson |
| RE39,478 E | 1/2007 | Hatch et al. |
| 7,209,325 B2 | 4/2007 | Boutaghou et al. |
| 7,224,554 B2 | 5/2007 | Wright |
| 7,293,348 B2 | 11/2007 | Erpelding |
| 7,301,729 B2 | 11/2007 | Wada et al. |
| 7,551,400 B2 | 6/2009 | Renken et al. |
| 8,142,671 B1 | 3/2012 | Pan |
| 8,159,785 B1 | 4/2012 | Lee et al. |
| 2003/0129935 A1 * | 7/2003 | Nuno .................. 451/520 |
| 2005/0135013 A1 | 6/2005 | Sassine et al. |
| 2010/0208389 A1 | 8/2010 | Ikeji |

OTHER PUBLICATIONS

Notice of Allowance dated Dec. 15, 2011 from U.S. Appl. No. 12/199,757, 7 pages.

\* cited by examiner

METHOD OF MANUFACTURING A DISK DRIVE SUSPENSION

CROSS REFERENCE TO RELATED APPLICATIONS

This application is a divisional of U.S. patent application Ser. No. 12/199,757, filed on Aug. 27, 2008, now U.S. Pat. No. 8,159,785, which is hereby incorporated by reference in its entirety.

BACKGROUND

Disk drives typically include at least one disk (such as a magnetic, magneto-optical, or optical disk), a spindle motor for rotating the disk, and a head stack assembly ("HSA"). The HSA may include at least one head mounted on a suspension for writing data to and reading data from the disk. The head is typically driven at high velocities across the disk by a voice coil motor ("VCM") to provide access to different locations.

Suspension dynamics play an important role in the performance of a disk drive as the head is moved back and forth across the disk. When the suspension becomes excited at a resonant frequency, the time required to settle on a desired track can be dramatically increased, and disk drive performance impacted. Moreover, in some cases, excitation of the disk drive suspension may result in off-track write errors or even contact between the head and the disk. Among the resonances of the disk drive suspension, the torsion and sway modes are typically the most critical.

In order to improve suspension dynamics and servo bandwidth, many disk drive suspensions now incorporate a damper. However, the effectiveness of dampers on typical suspensions depends heavily on the strain energy of those areas to which the dampers are attached. That is, applying a damper to a relatively stiff disk drive suspension often yields only modest improvements in disk drive suspension dynamics.

There is therefore a need for a disk drive suspension with improved dynamics.

DETAILED DESCRIPTION

Figure 1:
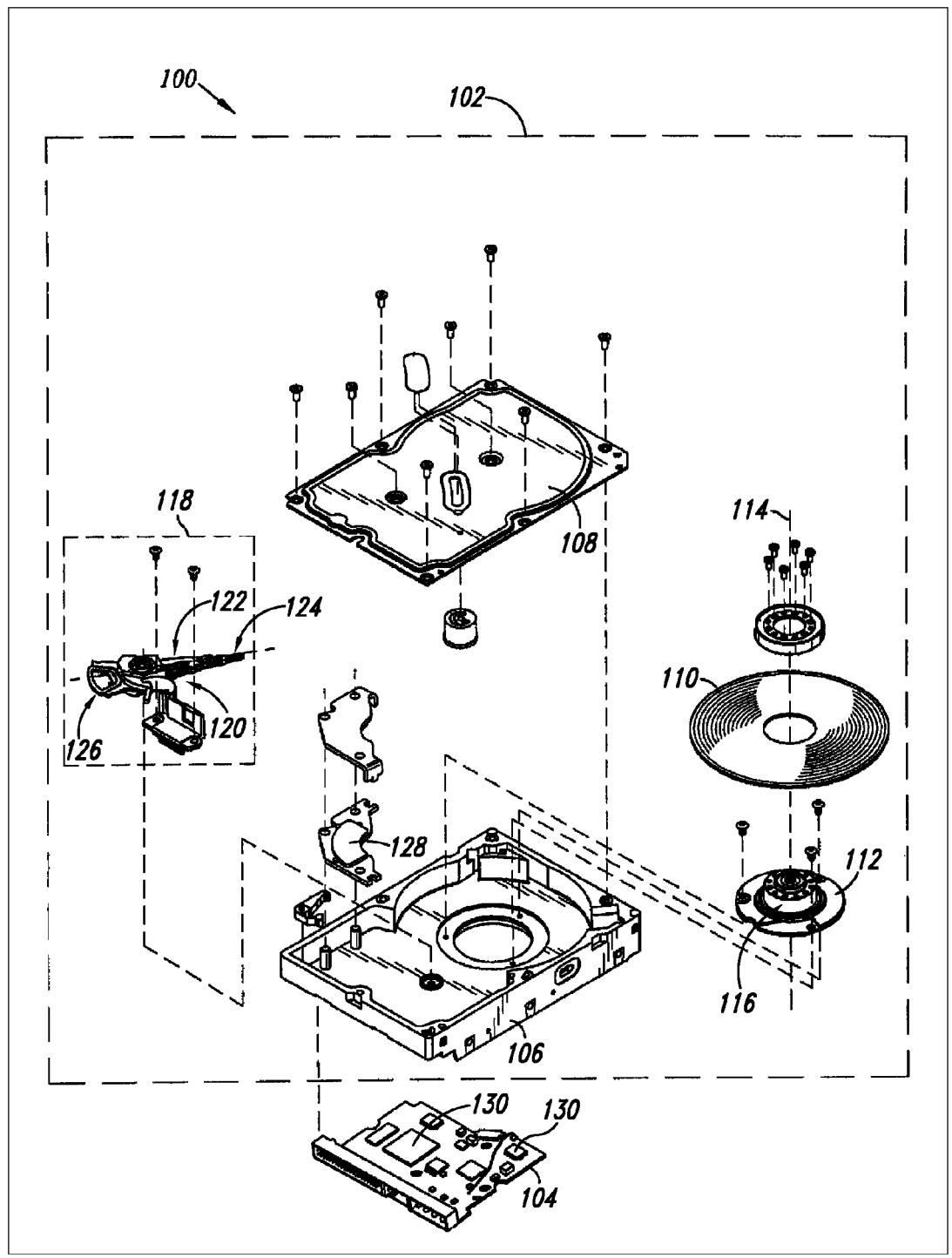
FIG. 1 is an exploded, perspective view generally illustrating a disk drive that may incorporate an embodiment.

Referring to FIG. 1, a disk drive 100 is illustrated, which may incorporate one or more embodiments of the disk drive suspension described in greater detail below. As illustrated, the disk drive 100 comprises a magnetic disk drive, and the structures and methods described herein will be described in terms of such a disk drive. However, the structures and methods described herein may also be applied to and/or implemented in other disk drives, including, e.g., optical and magneto-optical disk drives.

The disk drive 100 comprises a head disk assembly ("HDA") 102 and a printed circuit board ("PCB") 104. The HDA 102 includes a disk drive base 106 and a cover 108, which together house a number of disk drive components.

The disk drive 100 further includes a disk 110, which may comprise any of a variety of magnetic or optical disk media. In one embodiment, the disk 110 comprises a plurality of generally concentric tracks for storing data. In other embodiments, more disks 110 may be included in the disk drive 100.

As illustrated, a motor 112 is coupled to and configured to rotate the disk 110 about a disk axis of rotation 114. The motor 112 may include a motor hub 116 that is rotatably attached to the disk drive base 106.

The HDA 102 further includes a head stack assembly ("HSA") 118 rotatably attached to the disk drive base 106. The HSA 118 may include an actuator 120 having one or more actuator arms 122. A head gimbal assembly ("HGA") 124 may be attached to a distal end of each actuator arm 122. During operation, the actuator 120 may be rotated to position the HGA 124 adjacent a desired track on the disk 110. In order to accomplish this positioning, the HSA 118 may include a coil 126 through which a changing electrical current is passed. The coil 126 interacts with one or more magnets 128 to form a voice coil motor ("VCM") for controllably rotating the HSA 118.

Each HGA 124 includes a head for writing data to and reading data from the disk 110. The head may be adhered to a disk drive suspension that includes a gimbal, a load beam, a bend region and a swage plate. In some embodiments, a disk drive suspension like that described in detail below with respect to FIGS. 2-8 may be incorporated into the disk drive 100.

The PCB 104 may comprise any of a variety of circuit boards to which integrated circuits 130 may be coupled. The integrated circuits 130 may embody different logical subsystems used to control disk drive operations. For example, the integrated circuits 130 may include, inter alia, a disk drive controller for controlling read and write operations and a servo control system for generating servo control signals to position the HGAs 124 relative to the disk 110.

Figure 2:
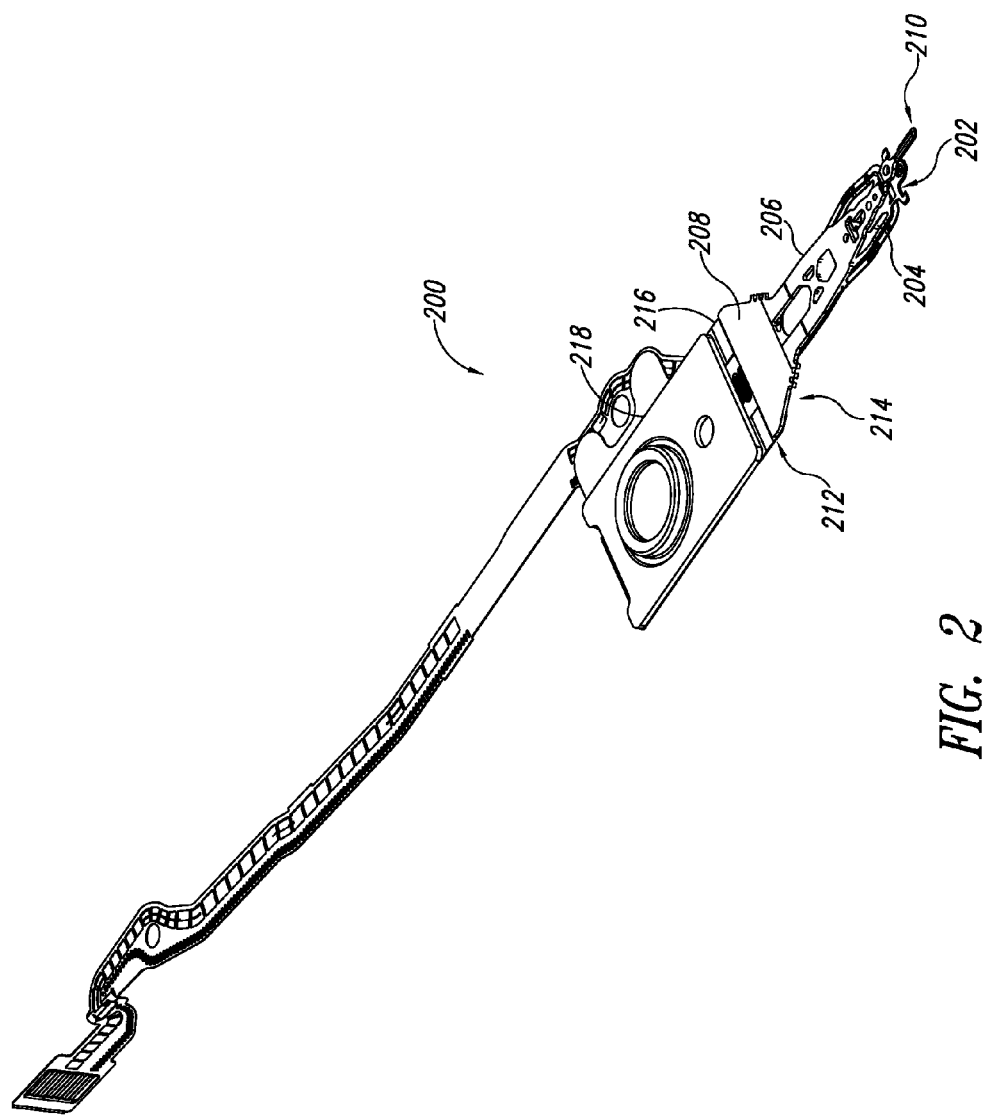
FIG. 2 is a top, perspective view illustrating an exemplary disk drive suspension, according to one illustrated embodiment.
Figure 3:
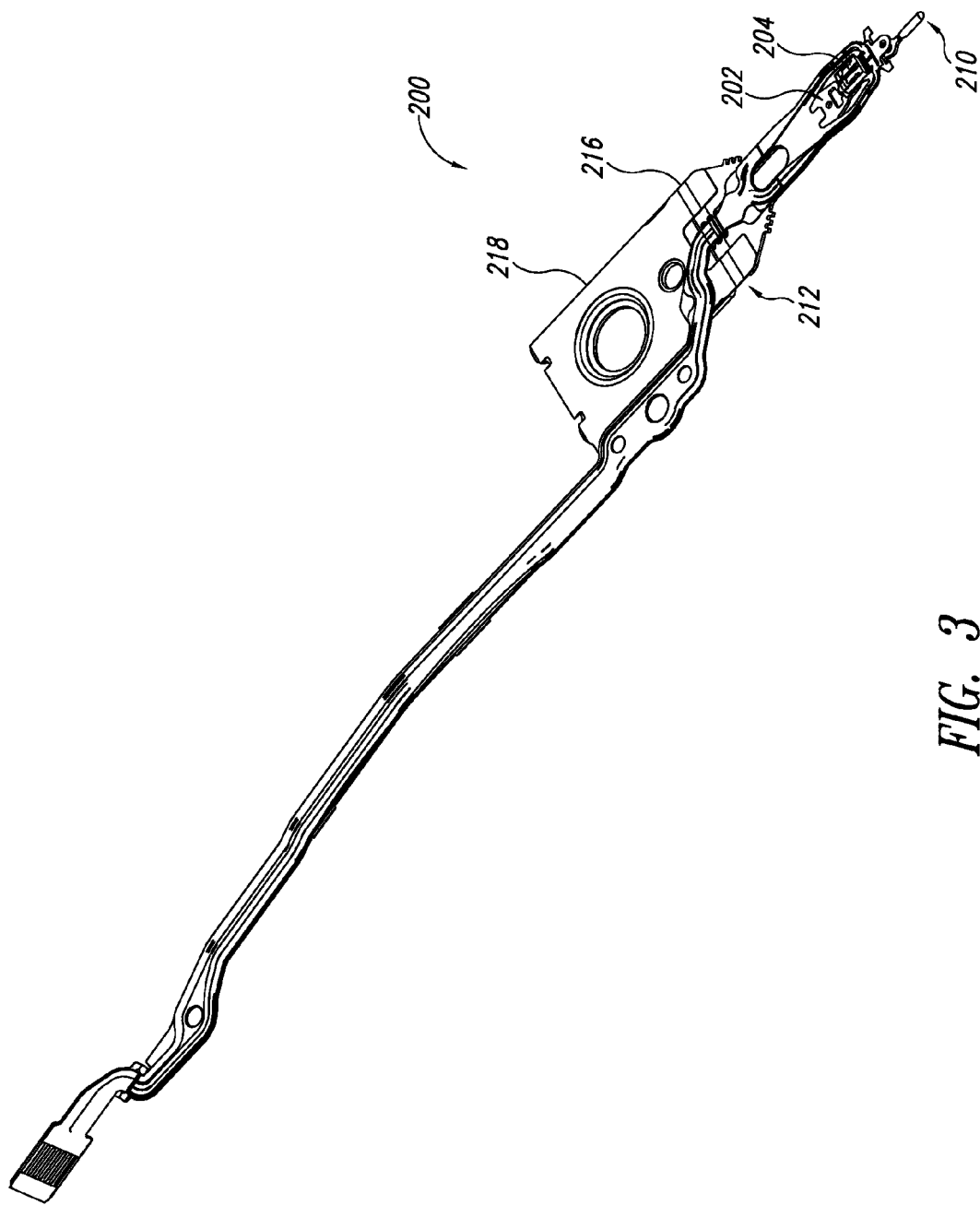
FIG. 3 is a bottom, perspective view illustrating the suspension of FIG. 2, according to one illustrated embodiment.

FIGS. 2 and 3 show top and bottom perspective views of an exemplary suspension 200 for a disk drive, according to one illustrated embodiment. As illustrated, the suspension 200 includes a gimbal 202 configured to receive a head 204, a load beam 206 and a constraint layer 208. The load beam 206 has a first end 210 and a second end 212 and defines a longitudinal axis between the first end 210 and the second end 212. The load beam 206 is coupled to the gimbal 202 proximate the first end 210 and includes a base region 214 proximate the second end 212. As illustrated, the constraint layer 208 overlays at least a portion of the base region 214. The configuration and geometry of the load beam 206 and the base region 214 are discussed in greater detail below with respect to FIGS. 4-8.

The gimbal 202 may comprise any of a variety of structures configured to receive the head 204. In one embodiment, the head 204 may be adhered to the gimbal 202. In other embodiments, other mechanisms for attaching the head 204 to the gimbal 202 may be used. In some embodiments, the gimbal 202 may be adapted to allow the head 204 to pivot about one or more axes to facilitate the reading and writing operations of the head 204.

The head 204 may comprise any of a variety of heads for writing data to and reading data from a disk. In magnetic recording applications, the head 204 may include an air bearing slider and a magnetic transducer that includes a writer and a read element. The magnetic transducer's writer may be of a longitudinal or perpendicular design, and the read element of the magnetic transducer may be inductive or magnetoresistive. In optical or magneto-optical recording applications, the head 204 may include a mirror and an objective lens for focusing laser light on to an adjacent disk surface.

The load beam 206 may have any of a variety of shapes and sizes. Although illustrated with a particular outline and a particular pattern of holes and crossing members, different geometries may be used along the length of the load beam 206 in order to improve a variety of characteristics, such as a fly-height of the head 204, or resonance characteristics of the suspension 200. In addition, different load beams may be incorporated into larger and smaller disk drive form factors, and may therefore have a variety of sizes.

In one embodiment, the load beam 206 is coupled to the gimbal 202 proximate the first end 210 of the load beam 206. As illustrated, the first end 210 of the load beam 206 represents a distal end farthest from a disk drive actuator (not shown), while the second end 212 represents a proximal end nearest the disk drive actuator. As used herein, the term "coupled" is a broad term encompassing any manner of physical engagement. In some embodiments, the load beam 206 need not be physically attached to the gimbal 202 at the first end 210 but may be otherwise physically engaged with the gimbal 202 proximate the first end 210. For example, as illustrated, the gimbal 202 may be physically attached to the load beam 206 near a center of the load beam 206 and positioned such that the head 204 is in physical engagement with and pivots about a feature of the load beam 206 proximate the first end 210. The gimbal 202 may be physically attached to the load beam 206 in a variety of ways, including adhesives, welding, etc.

In one embodiment, the load beam 206 includes a base region 214 proximate the second end 212. As illustrated, the base region 214 may define the second end 212 of the load beam 206. However, in other embodiments, the base region 214 may be separated from the second end 212 by at least some length of the load beam 206.

The load beam 206 may be formed from any of a variety of materials. In one embodiment, the load beam 206 is a monolithic, metallic component. For example, the load beam 206 may be etched or stamped from a single piece of stainless steel. In other embodiments, other materials and manufacturing methods may be used.

The constraint layer 208 may overlay at least a portion of the base region 214. In one embodiment, the constraint layer 208 acts as a damping layer for the suspension 200, damping vibrations that may arise in the suspension 200 during operation of a disk drive. A variety of materials may be used to form the constraint layer 208. For example, in different embodiments, the constraint layer 208 may comprise polyimide, stainless steel, MELINEX® 329 (produced by DuPont) or MYLAR® (also produced by DuPont). In some embodiments, the constraint layer 208 may itself comprise a plurality of layers of the same or different materials in order to achieve the desired damping characteristics.

The constraint layer 208 may have any of a variety of geometries. In one embodiment, the constraint layer 208 may overlay substantially all of the base region 214, as illustrated in the Figures. Moreover, the constraint layer 208 may be substantially congruent with the base region 214, as illustrated. Of course, in other embodiments, the constraint layer 208 may only overlay a portion of the base region 214 and may have a dramatically different shape than that of the base region 214. The constraint layer 208 may also have any of a variety of thicknesses. In one embodiment, the constraint layer 208 may have a thickness of between approximately 1 mil and 6 mil (i.e., between approximately 0.025 mm and 0.15 mm). Depending on the material(s) chosen for the constraint layer 208, different thicknesses may be optimal. Indeed, in some embodiments, the thickness of the constraint layer 208 may vary over its surface area.

The disk drive suspension 200 may further comprise a bend region 216 adjacent the second end 212 of the load beam 206. In one embodiment, the bend region 216 may function in part to preload the head 204 in the direction of a disk surface. The suspension 200 may further comprise a swage plate 218 adjacent the bend region 216. When assembled, the swage plate 218 may be coupled to a distal end of an actuator arm (not shown) by a swaging process.

Figure 4:
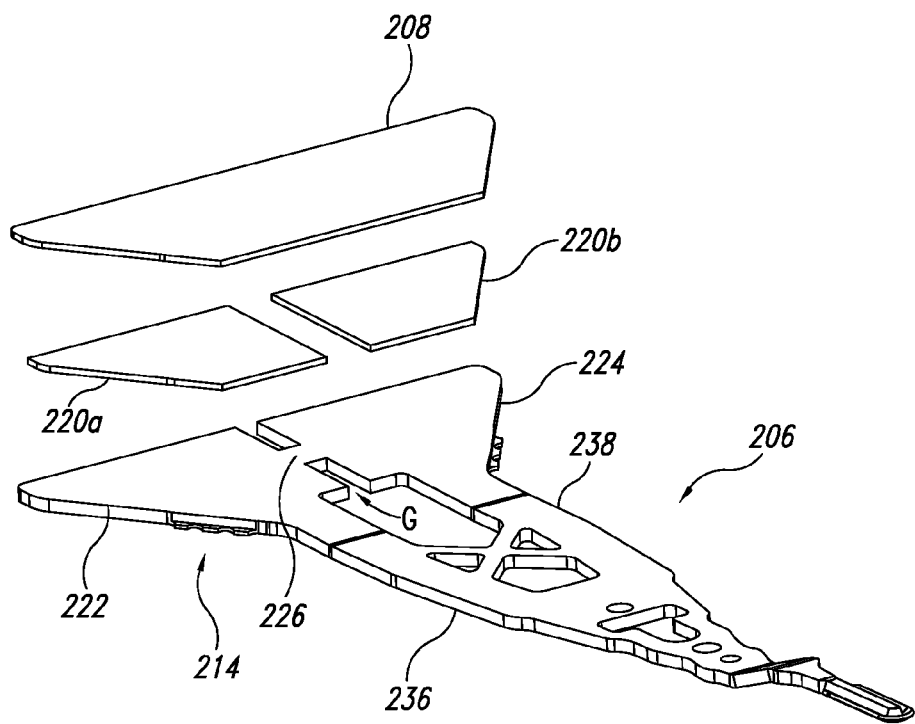
FIG. 4 is an exploded, perspective view of a load beam, adhesive layers and constraint layer of the disk drive suspension of FIG. 2, according to one illustrated embodiment.
Figure 5:
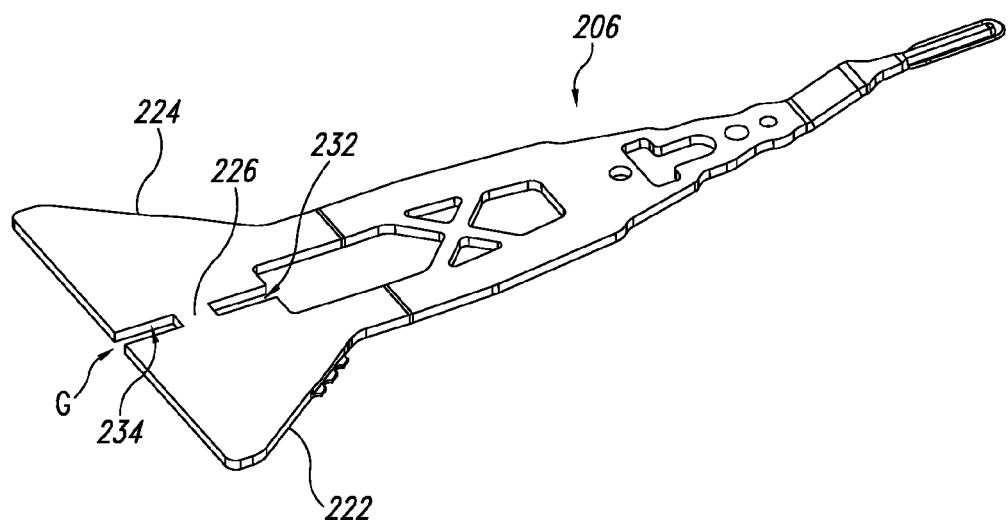
FIG. 5 is a perspective view of the load beam of FIG. 4, according to one illustrated embodiment.
Figure 6:
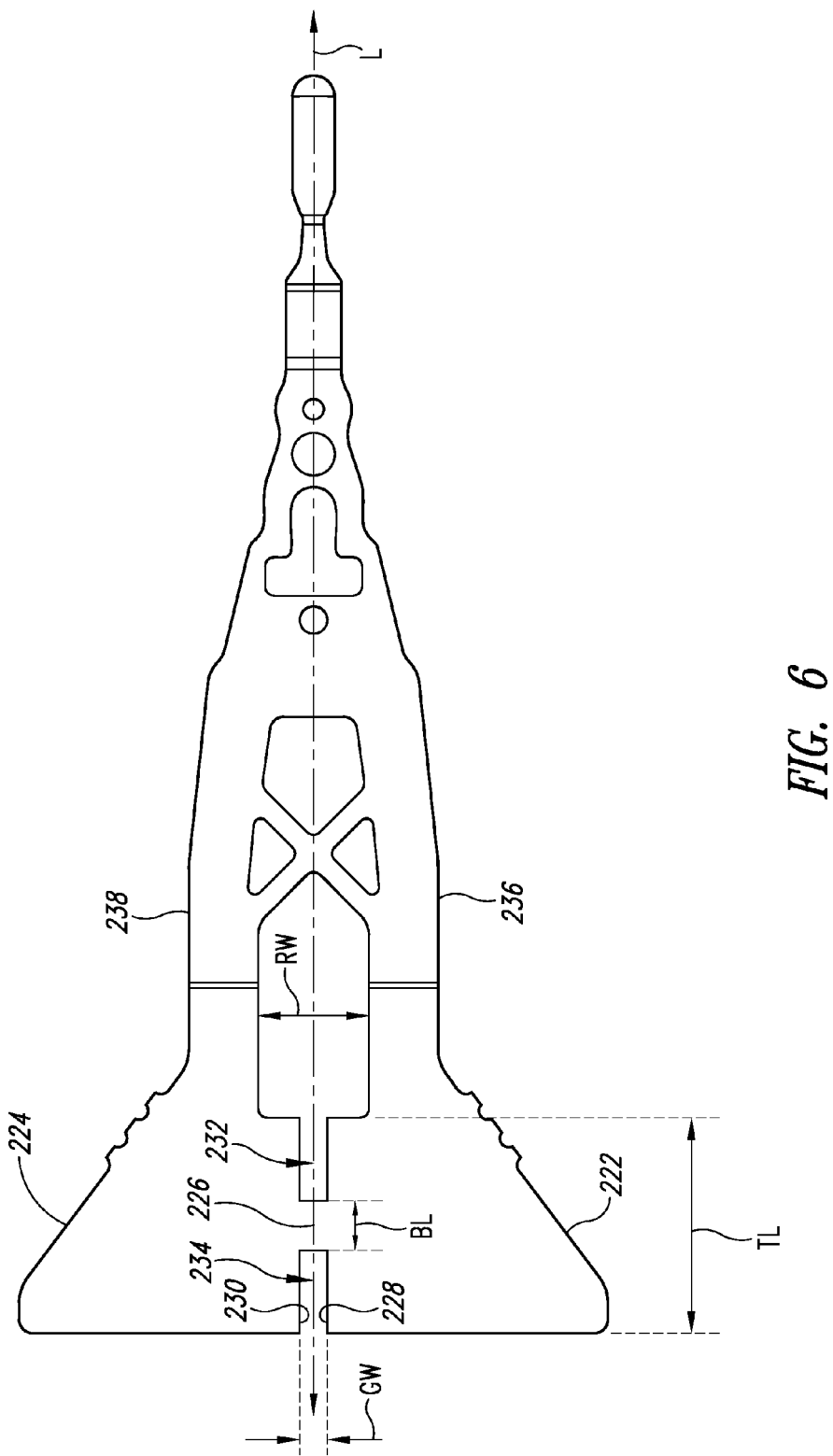
FIG. 6 is a top view of the load beam of FIG. 4, according to one illustrated embodiment.
Figure 7:
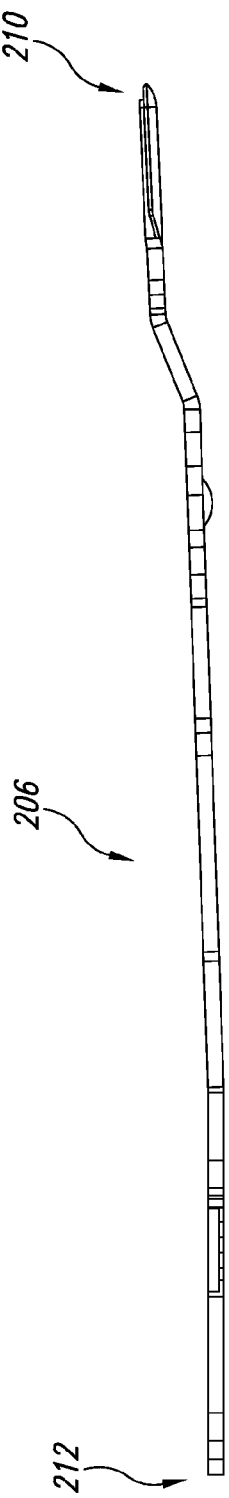
FIG. 7 is a side view of the load beam of FIG. 4, according to one illustrated embodiment.
Figure 8:
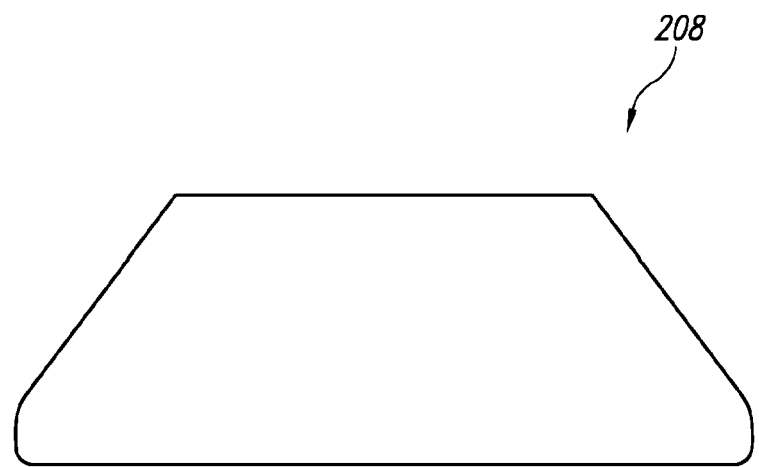
FIG. 8 is a top view of the constraint layer of FIG. 4, according to one illustrated embodiment.

FIG. 4 is an exploded, perspective view of the load beam 206, adhesive layers 220a, b and the constraint layer 208 of the disk drive suspension 200 of FIG. 2. FIGS. 5-7 show perspective, top and side views of the load beam 206, and FIG. 8 illustrates a top view of the constraint layer 208. The geometry and arrangement of these parts are discussed in further detail below with reference to these Figures.

As illustrated, the base region 214 of the load beam 206 may have a first lateral section 222 to one side of a longitudinal axis L (shown in FIG. 6) of the load beam 206 and a second lateral section 224 to another side of the longitudinal axis L. The first and second lateral sections 222, 224 define a gap G therebetween. In one embodiment, the base region 214 has a bridge section 226 extending across the gap G between the first lateral section 222 and the second lateral section 224.

As shown in FIG. 6, the gap G may be defined between a first edge 228 of the first lateral section 222 and a second edge 230 of the second lateral section 224, the second edge 230 opposite the first edge 228. The gap G may have any of a variety of widths. In one embodiment, the gap G may have a width GW (as illustrated in FIG. 6) of less than approximately 0.4 mm. In another embodiment, the gap G may have a width GW of between approximately 0.05 mm and 0.4 mm. In one embodiment, the width GW may be chosen based at least in part upon a desired resonant frequency for the load beam 206, as well as upon a desired elastic strain energy at the base region 214. In other embodiments, more complex contours of the first and second lateral sections 222, 224 may define the gap G, and the gap G may have a varying width along the longitudinal axis L.

In the illustrated embodiment, the gap G is substantially aligned with the longitudinal axis L of the load beam 206. However, in other embodiments, the gap G may be off-center with respect to the longitudinal axis L.

The gap G may also be divided into two or more portions by one or more bridge sections. As best seen in FIGS. 5 and 6, in one embodiment, a first portion 232 of the gap G extends from the bridge section 226 towards the first end 210 of the load beam 206, and a second portion 234 of the gap G extends between the second end 212 of the load beam 206 and the bridge section 226. In other embodiments, additional bridge sections may extend across the gap G, thus further dividing the gap G longitudinally.

The bridge section 226 may also be substantially centered longitudinally along the gap G. Thus, a length of the first portion 232 of the gap G along the longitudinal axis L may be substantially equal to a length of the second portion 234 of the gap G along the longitudinal axis L. In other embodiments, the bridge section 226 may be off-center along the longitudinal axis L. For example, if the bridge section 226 is shifted towards the first end 210, the base region 214 may have a lower resonant frequency, and the constraint layer 208 affixed thereto may have an increased damping effect. Thus, the bridge section 226 may be moved farther away from or closer to the first end 210 in order to "tune" a resonant frequency and damping effect.

The bridge section 226 can have any of a variety of lengths measured along the longitudinal axis L. In one embodiment, a ratio of a length of the bridge section 226, illustrated as BL in FIG. 6, measured along the longitudinal axis L of the load beam 206 to a length of the base region 214, illustrated as TL in FIG. 6, measured along the longitudinal axis L of the load beam 206 may be between 1/5 and 1/3. In one embodiment, the first portion 232 of the gap G and the second portion 234 of the gap G may therefore each have a length of approximately 1/3 to 2/5 the length TL of the base region 214. In some embodiments, the length TL of the base region 214 may be between approximately 0.5 mm and 2 mm, and therefore the length BL of the bridge section 226 may be between approximately 0.1 mm and 0.66 mm.

The load beam 206 may further include a first leg section 236 extending from the first lateral section 222 towards the first end 210 of the load beam 206, and a second leg section 238 extending from the second lateral section 224 towards the first end 210 of the load beam 206. These leg sections 236, 238 may be monolithic with the lateral sections 222, 224 and may also be separated at least in part by a lightening feature. As illustrated, this lightening feature may be formed by the removal of at least some of the material of the load beam, thereby separating the leg sections 236, 238. The lightening feature may be substantially wider than the gap G separating the first and second lateral sections 222, 224. For example, as illustrated in FIG. 6, a width RW of the lightening feature may be between approximately 0.4 mm and 1.0 mm. In one embodiment, the width RW of the lightening feature may be at least twice the width GW of the gap G. Of course, other geometric relationships are possible in other embodiments.

In the illustrated embodiment, the base region 214 is flared laterally in a direction of the second end 212 of the load beam 206 from the first and the second leg sections 236, 238. Of course, in other embodiments, the base region 214 may have a different geometry. For example, in one embodiment, the base region 214 may have substantially the same width along the longitudinal axis L. In other embodiments, more complex geometries may be employed to form the base region 214.

FIG. 7 shows a side view of the load beam 206. As illustrated, the first end 210 may be bent out of plane from the rest of the load beam 206. Of course, in other embodiments, more or less complex geometries may be chosen for the load beam 206.

In one embodiment, as illustrated in FIG. 8, the constraint layer 208 may have a shape that is substantially congruent with the shape of the base region 214. Thus, the constraint layer 208 may overlay both the first lateral section 222 and the second lateral section 224 and extend across the gap G. As described above, in operation, the constraint layer 208 may act to damp vibrations that arise in the base region 214. In other embodiments, different geometries may be used for the constraint layer 208.

Returning to FIG. 4, the adhesive layers 220a, b (collectively 220) may couple the constraint layer 208 to the base region 214 of the load beam 206. In one embodiment, the suspension 200 comprises a first adhesive layer 220a between the first lateral section 222 and the constraint layer 208, and a second adhesive layer 220b between the second lateral section 224 and the constraint layer 208. The first adhesive layer 220a may be separate from the second adhesive layer 220b. Thus, in one embodiment, the adhesive layers 220 may couple the constraint layer 208 to the base region 214 without overlaying any portion of the gap G, thereby minimizing adhesive exposure within the disk drive.

In other embodiments, a single adhesive layer may couple the constraint layer 208 to the load beam 206. For example, an adhesive layer having a shape generally similar to the base region 214 may be used, and such an adhesive layer may even include a bridge section shaped similarly to the bridge section 226. In other embodiments, more than two adhesive layers may couple the constraint layer 208 to the load beam 206.

Any of a variety of adhesive materials may be used to form the adhesive layers 220. In one embodiment, the adhesive layers 220 act in concert with the constraint layer 208 to provide damping, and thus materials may be chosen for the adhesive layers 220 to enhance this damping effect. In one embodiment, a viscoelastic adhesive may be used for the adhesive layers 220. For example, JDC MP65 or JDC MD15 adhesives, both produced by JDC, Inc., may be used. In another embodiment, 3M 242 adhesives, produced by 3M, may be used. In still other embodiments, other adhesive materials may be used.

The adhesive layers 220 may have any of a variety of thicknesses. In one embodiment, the adhesive layers 220 may have a thickness of between approximately 1 mil and 8 mil (i.e., between approximately 0.025 mm and 0.2 mm). Of course, depending on the adhesives chosen, different thicknesses may be optimal.

In still other embodiments, the adhesive layers 220 may be omitted. For example, the constraint layer 208 may itself comprise an adhesive layer or may otherwise have adhesive properties and may be coupled to the base region 214 without additional adhesives. In other embodiments, the constraint layer 208 may be otherwise coupled to the base region 214.

Figure 9:
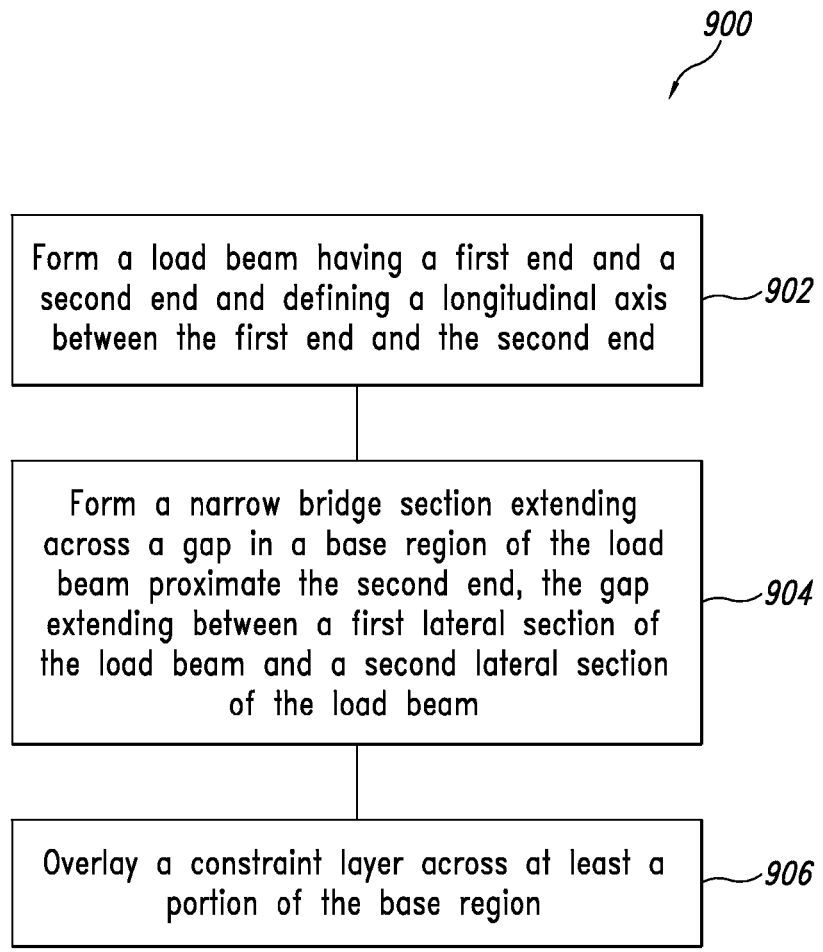
FIG. 9 illustrates a flow chart for a method of manufacturing a suspension for a disk drive, according to one illustrated embodiment.

FIG. 9 illustrates a flow chart for a method 900 of manufacturing a suspension for a disk drive, according to one illustrated embodiment. This method 900 will be discussed in the context of the disk drive suspension 200 of FIGS. 2-8. However, the acts disclosed herein may be executed to manufacture a variety of different disk drive suspensions, in accordance with the described method.

As described herein, all of the acts comprising the method 900 may be orchestrated in one embodiment by a processor according to an automatic suspension manufacturing algorithm, based at least in part on computer-readable instructions stored in computer-readable memory and executable by the processor. Of course, a manual implementation of one or more acts of the method 900 may also be employed.

At act 902, a load beam 206 is formed, the load beam 206 having a first end 210 and a second end 212 and having a longitudinal axis L between the first end 210 and the second end 212. The load beam 206 may be formed in a variety of ways. In one embodiment, the load beam 206 is formed via an etching, stamping or casting process. In another embodiment, the load beam 206 may be formed via other machining processes.

At act 904, a bridge section 226 is formed, the bridge section 226 extending across a gap G in a base region 214 of the load beam 206 proximate the second end 212, the gap G extending between a first lateral section 222 of the load beam 206 and a second lateral section 224 of the load beam 206. The bridge section 226 and the corresponding gap G may be formed in a variety of ways. In one embodiment, acts 902 and 904 may be performed substantially simultaneously using the same manufacturing process. However, in other embodiments, acts 902 and 904 may be performed at different times using different manufacturing processes. For example, in one embodiment, a general shape of the load beam 206 may be formed by a stamping or casting process at act 902, and then the bridge section 226 may be formed via a machining process at act 904.

At act 906, a constraint layer 208 is overlaid across at least a portion of the base region 214. In one embodiment, the constraint layer 208 may be aligned with at least a portion of the base region 214 and coupled thereto. For example, a first adhesive layer 220a may be formed between the first lateral section 222 and the constraint layer 208, and a second adhesive layer 220b may be formed between the second lateral section 224 and the constraint layer 208. In other embodiments, other methods and/or structures for coupling the constraint layer 208 to the base region 214 may be employed.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in integrated circuits, as one or more programs executed by one or more processors, as one or more programs executed by one or more controllers (e.g., microcontrollers), as firmware, or as any suitable combination thereof.

We claim:

1. A method of manufacturing a suspension for a disk drive comprising:
   providing and assembling an actuator coupling plate, a bend region, a load beam, and a head receiving gimbal;
   wherein the load beam has a first end adjacent the head receiving gimbal, and the load beam has a base region with a second end adjacent to the bend region, the bend region being disposed between the second end and the actuator coupling plate, the load beam having a longitudinal axis bisecting the first end and bisecting the second end, the load beam including first and second legs, and a lightening opening disposed between the first and second legs;
   wherein the base region of the load beam includes a gap that is closer to the second end than is the lightening opening, a lateral width of the lightening opening being at least twice a lateral width of the gap, the gap and the longitudinal axis being disposed between a first lateral section of the base region and a second lateral section of the base region;
   wherein the base region of the load beam includes a bridge extending laterally across the gap; and
   overlaying a constraint layer laterally across the gap and over the bridge.

2. The method of claim 1, further comprising:
   forming a first adhesive layer between the first lateral section and the constraint layer; and
   forming a second adhesive layer between the second lateral section and the constraint layer.

3. The method of claim 2, wherein each of the first and second adhesive layers comprises a viscoelastic adhesive and has an adhesive thickness in the range of 0.025 mm to 0.2 mm.

4. The method of claim 1, wherein the gap is substantially aligned with the longitudinal axis of the load beam.

5. The method of claim 1, wherein a first portion of the gap is disposed on one side of the bridge, and a second portion of the gap is disposed on another side of the bridge, the first portion extending from the bridge towards the first end of the load beam, and the second portion extending between the second end of the load beam and the bridge.

6. The method of claim 1, wherein the first leg extends from the first lateral section towards the first end of the load beam, and the second leg extends from the second lateral section towards the first end of the load beam.

7. The method of claim 1, wherein overlaying the constraint layer comprises overlaying the constraint layer across substantially all of the base region.

8. The method of claim 7, wherein the constraint layer is substantially congruent with the base region.

9. The method of claim 1, wherein a ratio of a length of the bridge measured along the longitudinal axis of the load beam to a length of the first lateral section measured along the longitudinal axis of the load beam is between 1/5 and 1/3.

10. The method of claim 9, wherein the length of the bridge measured along the longitudinal axis of the load beam is in the range of 0.1 mm to 0.66 mm.

11. The method of claim 1, wherein the actuator coupling plate is a swage plate.

12. The method of claim 1, wherein the constraint layer has a thickness of between 0.025 mm and 0.15 mm.

13. The method of claim 1, wherein the lateral width of the gap is in the range of 0.05 mm to 0.4 mm.

14. The method of claim 1, wherein the lateral width of the lightening opening is in the range of 0.4 mm to 1.0 mm.

15. The method of claim 1, wherein the load beam comprises stainless steel, and providing the load beam includes etching the gap in the load beam.

* * * * *